INVENTORS
NORMAN A. JULL
HERBERT A. McCRACKEN
JAMES C. L. GRAHAM

BY *Cavanagh & Norman*

3,520,319
MULTIPLE INLET BALL CHECK VALVE
Norman A. Jull, Toronto, Ontario, Herbert A. Mc-
   Cracken, Brampton, Ontario, and James C. L.
   Graham, Don Mills, Ontario, Canada, assignors
   to The Technequip Company Limited, Weston,
   Ontario, Canada
      Filed June 7, 1968, Ser. No. 735,392
      Int. Cl. G05d *11/00;* F16k *15/04*
U.S. Cl. 137—111                                              3 Claims

ABSTRACT OF THE DISCLOSURE

The disclosure sets forth a large multiple inlet valve in which the configuration is based on a radial array of parts about an outlet axis in such manner that the motion of the check valve ball is radial in direction in progressing from one inlet opening to another. The choice of motion being unlimited by the valve geometry.

---

This invention relates to a large multiple inlet ball check valve useful in the handling of pipeline fluids in oil transportation chemical processing plants and the like where piping sizes range from about six inches to greater than sixty inches.

One form of large multiple inlet ball check valve is shown in Pat. 3,444,881 issued May 20, 1969 and assigned to the same assignee as the instant application. In such prior new class of industrial valve a circular race is provided about the outlet axis whereby the ball of the valve migrates from one inlet opening to another by a circular path responsive to changes in pressure at the inlet openings. Such arrangement requires a successive closing of inlet openings.

The present form of ball check valve of the same class as the previous invention referred to differs therefrom in providing a structure of greater simplicity of manufacture and design and of different geometry and operation.

It is the main object of the invention to provide a multiple inlet ball check valve for large valve industrial application in which the ball must migrate from one inlet opening to another by passing through radial paths extending to the outlet opening axis of the valve.

It is a further object of the invention to provide a ball check valve in which the ball passes under pressure to a central axis for distribution to any other inlet opening whereby the ball is available to close directly any inlet opening from a position of closure of any other inlet opening.

Other objects of the invention will be appreciated by a study of the following specification taken in conjunction with the accompanying drawings.

Figure 1:
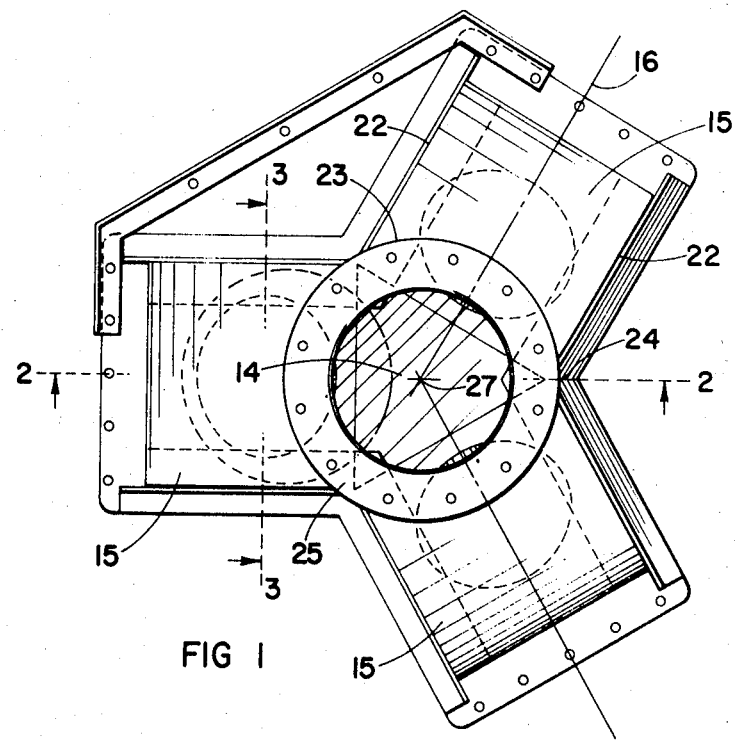
FIG. 1 is a plan view of a valve of the invention.
Figure 2:
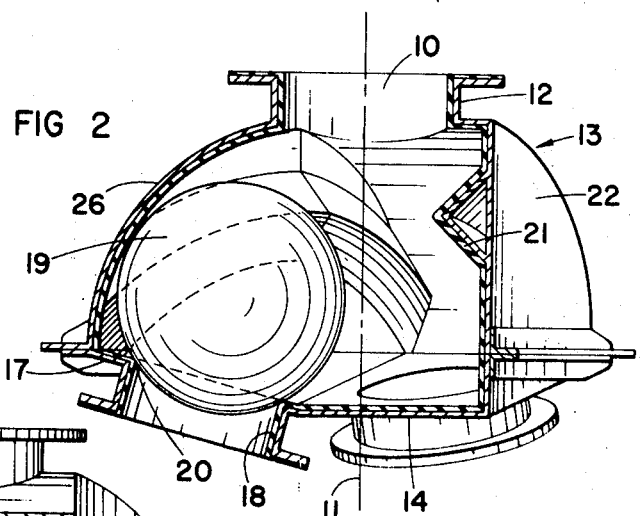
FIG. 2 is a section on the line 2—2 of FIG. 1.
Figure 3:
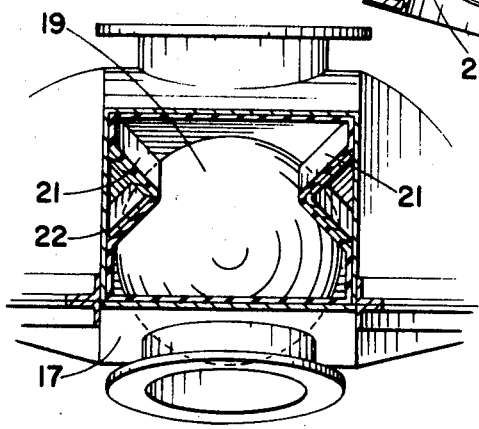
FIG. 3 is a section on the line 3—3 of FIG. 1.

Referring to the drawings wherein a triple inlet form of multiple inlet valve of the invention is shown in detail by way of example an outlet opening 10 having axis 11 is defined by a suitable fitting structure 12 extending from valve body 13 defined in turn by an axially located triangular base plate 14 corresponding to a triangular configuration for three inlet chamber structures 15 extending on radial axes 16 therefrom.

Each of the radial inlet chamber structures 15 comprises an inwardly tilted inlet valve seat base wall 17 carrying an inlet fitting 18 adapted sealably to receive ball 19 preferably of large relative diameter of the order of about 1.2 times the diameter of inlet opening 20 of fitting 18.

Each inlet chamber structure 15 carries inwardly directed guideways 21 arcuately extending by a peripheral path of ball motion toward central axis 11 but joining with sidewall members 22 with corresponding guideways and sidewall members of the adjacent chamber structures as at junctures 23, 24 and 25 at regions of the apices of the triangular base plate 14. Thus for example in quadrature form the base plate is square and the four inlet chamber structures join at the corners of such square configuration (not shown).

The top wall 26 of each inlet structure is preferably of arcuate form substantially as shown being spaced above guideways 19 sufficient to establish clearance for the ball in the arcuate path of motion toward axis 11.

The inner surfaces of the valve carry a substantially uniform covering of an elastomer material such as natural or synthetic rubber. The ball 19 is preferably formed entirely of natural rubber. In all forms the axis 11 will intersect the centroid 27 of base plate 14.

What we claim is:

1. In a multiple inlet ball check valve: an outlet fitting having an outlet axis; a base plate having a geometric configuration describing a predetermined number of equiangular corners and having a centroid intersected by said axis; a plurality of inlet opening structures corresponding in number to the number of said base plate corners, each being in the form of an inlet base plate having an inlet fitting opening therein of predetermined diameter, side walls and arcuate guide means joining at lines of intersection with corresponding side walls and arcuate guide means of adjacent inlet structures substantially at the region of said base plate corners, and top wall structure extending from each of said inlet base plates to said outlet fitting; and a ball for said valve of a diameter substantially greater than that of said inlet openings and movable on a radial path within each inlet structure to said axis and any other inlet structure.

2. The valve as claimed in claim 1 having interior surfaces all of which are coated with an elastomer material.

3. The valve as claimed in claim 1 having three inlet openings and a triangular base plate.

References Cited
UNITED STATES PATENTS

| | | | |
|---|---|---|---|
| 315,521 | 4/1885 | Lord et al. | 137—113 |
| 3,195,660 | 7/1965 | McKown | 137—533.11 X |
| 3,444,881 | 5/1969 | Harper | 137—112 |

WILLIAM F. O'DEA, Primary Examiner

D. J. ZOBKIW, Assistant Examiner

U.S. Cl. X.R.

137—112; 251—368